United States Patent [19]

Hoffman

[11] Patent Number: 5,011,741
[45] Date of Patent: Apr. 30, 1991

[54] LINERBOARD CONTAINING RECYCLED NEWSPRINT

[75] Inventor: Roger P. Hoffman, Green Bay, Wis.

[73] Assignee: Green Bay Packaging, Inc., Green Bay, Wis.

[21] Appl. No.: 496,814

[22] Filed: Mar. 20, 1990

[51] Int. Cl.$^5$ .............................................. B30B 21/06
[52] U.S. Cl. ............................ 428/503.1; 428/903.3; 428/537.5; 162/129; 162/158
[58] Field of Search ................ 162/129, 158; 428/532, 428/903.3, 534, 537.5

[56] References Cited

U.S. PATENT DOCUMENTS

| | | | |
|---|---|---|---|
| 3,562,097 | 2/1971 | Von Hazmburg | 162/129 |
| 4,470,877 | 8/1984 | Johnston et al. | 162/158 |

OTHER PUBLICATIONS

Beloit Corporation Deinking Manual, 2nd Ed., Sep. 1979, Beloit Corporation.

*Primary Examiner*—Edith Buffalow
*Attorney, Agent, or Firm*—Andrus, Sceales, Starke & Sawall

[57] ABSTRACT

A multi-ply paper product, such as linerboard, composed of a base ply of Kraft pulp and a top ply of de-inked, reclaimed newsprint. A dry strength additive, such as cooked starch, is incorporated in the plies and serves to improve the internal strength of the top newsprint ply, as well as improving the bond between the plies.

11 Claims, No Drawings

LINERBOARD CONTAINING RECYCLED NEWSPRINT

BACKGROUND OF THE INVENTION

The disposal of old or reclaimed newsprint has become a serious ecological problem. Currently the United States uses approximately 13,000,000 tons of newsprint annually and yet only about 3,000,000 tons are recycled. The major portion of old newsprint is deinked and used in newsprint production, while a minor portion is used in certain paperboard products, such as folding carton grades, which have low strength requirements. The recycling of old newsprint has been limited due to its low tear strength. Virgin newsprint stock is normally produced from ground wood and contains relatively short fibers, and has a low tear strength. The pulping of old newsprint further reduces the fiber length, so that the amount of old newsprint pulp that can be used in combination with virgin newsprint pulp is limited.

Newsprint is an extremely difficult grade of paper to produce, due to its low tear strength, and to be made competitively it is produced at very high speeds with machines running in excess of 4500 fpm. For this reason, the level of cleaning required is very great to produce a commercially acceptable product using old newsprint as a fiber supply.

When using old newsprint as a fiber supply in the production of newsprint, the old newsprint, after pulping, is deinked by one of a number of conventional deinking processes, such as described in "Beloit Corporation Deinking Manual", 2nd Ed., 1979. In general, the deinking process acts to remove ink from the fibers with minimum fiber damage and to disperse the ink particles freely in the aqueous pulp suspension to enable subsequent mechanical separation or removal. In the typical deinking process the old newsprint is pulped with water and chemical dispersants and the shear forces encountered during the pulping provide some mechanical dispersion of the ink. In addition, the dispersants act to chemically disocciate the ink from the fibers.

Once the ink has been chemically separated from the fibers, there are two basic manners for the removal of the ink from the pulp slurry. One is dilution washing which is a mechical process of rinsing the ink particles from the pulp, while the second is froth flotation, which is a chemical/mechanical process of selectively floating the ink particles from a dilute pulp suspension.

After deinking, the deinked old newsprint pulp can then be used in combination with virgin newsprint pulp in the production of newsprint.

Corrugated paperboard consists of a central layer of corrugated medium sandwiched between two outer layers of linerboard. Linerboard typically is a two-ply product having a basic weight of 20 to 90 lbs. per 1,000 sq. ft. The base ply can be composed of Kraft pulp or recycled or old corrugated containers, while the top or outer ply normally consists of virgin Kraft pulp to cover up the visual containments in the base ply. In some situations, the outer or top ply may be composed of bleached fibers to improve the visual appeal of the corrugated product.

Approximately 20,000,000 tons of linerboard are produced annually in the United States. It is apparent that if old newsprint could be incorporated as a component of linerboard, it would provide a substantial use for the old newsprint which is presently being discarded. However, because of the short fiber characteristics of old newsprint and the presence of substantial fines, old newsprint has been considered totally unacceptable for use in a paperboard product having high strength requirments, such as linerboard.

SUMMARY OF THE INVENTION

The invention is directed to a multple ply paper product, such as linerboard, composed of a base ply of Kraft pulp and a top or outer ply of deinked, reclaimed, or old newsprint. A dry strength additive, such as cooked or hydrolyzed starch, is incorporated in the plies and acts to increase the internal strength of the outer newsprint ply, as well as improving the bond between the plies.

The base ply is produced from a Kraft pulp stock, which can either be virgin Kraft pulp or may contain up to 100% of recycled or old corrugated containers. One or more Kraft base plies can be included in the linerboard.

To produce the top ply of de-inked, recycled newsprint, the old newsprint is initially pulped with conventional chemical dispersants. During pulping the ink is subjected to some mechanical dispersion from the shear forces, but the primary dissociation of the ink from the fibers is achieved by chemical action. The chemical dispersants can include a surfactant to emulsify the petroleum ink vehicle and release the carbon black particles. With offset newsprint ink, sodium silicate can be incorporated with the surfactant. The sodium silicate provides alkalinity and its abrasive nature aids in releasing and dispersing the ink particles.

In certain situations, hydrogen peroxide and chealating agents can also be used in the deinking, aiding in solubilizing certain oils in the ink and acting as a brightening agent.

Once the ink has been chemically dissociated from the fibers, the pulp is screened to remove large sized foreign materials and the dissociated ink is then removed from the pulp stock, preferably by a washing process. In the preferred washing process, the diluted newsprint pulp is discharged through a jet into a converging nip between a couch roll and a porous belt or screen, and the major portion of the liquid, as well as the fines, pass through the screen, while the fibrous material will adhere to the roll. This process can be terminated after a single stage, or may encompass multiple stages in series. The pulp is then removed from the roll, diluted, and conducted to the forming section of a papermaking machine, where the newsprint pulp is deposited as a layer or ply on a base layer or ply of the Kraft pulp stock. The newsprint stock is preferably employed in an amount of about 4 to 30 lbs. per 1,000 sq.ft. of the linerboard.

The dry strength agent, such as cooked starch, is introduced either into the Kraft pulp stock or the newsprint pulp stock, or both. In the normal papermaking process, the water extracted from the pulp layers in the forming section will be recycled and used for dilution of the incoming pulp stock. Thus, starch added to either pulp stock will permeate both pulp stocks due to the recycling, and thus the starch will be impregnated in both the outer newsprint ply and the base Kraft ply. The starch acts to increase the internal dry strength of the outer newsprint ply, as well as improving the bond between the plies.

After drying, a size, such as ethylated corn starch, can be applied through a conventional size press to the outer surface of the top newsprint ply.

The invention has a substantial impact on the ecology, by enabling deinked old newsprint, which would otherwise be disposed of in landfills, to be incorporated in the production of paperboard products, such as linerboard, having high strength requirements.

The de-inked newsprint in the outer or top ply provides a brighter, more attractive appearance for the linerboard. For example, the linerboard of the invention has a brightness in the range of 30 to 60 as measured on the photovolt scale, as opposed to unbleached Kraft liner board which has a brightness of only 16 to 18. The improved brightness provides better graphic presentation and higher resolution.

As a further advantage, the use of the old newsprint in the top ply provides an outer surface having higher frictional resistance, which is an important factor in corrugated containers, for the higher friction surface will prevent sliding or displacement of containers when they are in a stacked relation.

While the invention has particular use in producing linerboard, it can also be used for other grades of multi-ply paper having higher strength requirements.

Other objects and advantages will appear in the course of the following description.

DESCRIPTION OF THE PREFERRED EMBODIMENT

The invention is directed to a multiple ply paper product, such as linerboard, composed of at least one base ply of Kraft pulp and an outer ply of de-inked reclaimed or old newsprint. The liner board, in general, has a basis weight in the range of 20 to 90 lbs. per 1,000 sq. ft.

A dry strength additive, such as cooked cationic starch, is incorporated in at least the outer newsprint ply and acts to increase the internal strength of the outer ply, as well as improving the bond between the plies. The outer newsprint ply, has a dry weight basis of 4 to 30 lbs. per 1,000 sq.ft.

The base ply is composed of Kraft pulp and can either be virgin softwood or hardwood pulp, or mixtures thereof, or alternately may contain up to 100% of recycled old corrugated containers.

The base ply may be produced by a typical Kraft process in which wood chips are cooked at a temperature of approximately 340° F. with the addition of sodium hydroxide and sodium hydrosulfide (conventional Kraft white liquor) for a period of about 20 to 60 minutes to dissolve the lignin and hemi-cellulose. After cooking, the pulp is washed which acts to remove up to 98% of the treating chemicals. The pulp is then diluted with water to a solids content of about 4% and treated with sulfuric acid and alum to obtain a pH generally in the range of about 6.6 to 8.0. This pH is higher than that normally used in a typical Kraft linerboard mill. Typically linerboard is produced in the range of about 4.0 to 5.0 pH. It is believed that the higher pH is a factor in providing the improved bond between the Kraft and newsprint plies. The pulp stock at the abovementioned pH range is then delivered to the head box of the forming section of the papermaking machine, as will be hereinafter described. In order to adequately internally size the linerboard at this elevated pH a neutral or alkaline sizing agent must be used.

Newsprint, which differs from other grades of paper, such as ledger grade and magazine grade, is produced by mechanical pulping or thermal-mechanical pulping. As a result, newsprint typically is composed of relatively short fibers and, as such, has a low tear strength.

Printing ink is composed of two basic components, colored solids, and a vehicle to carry the colored material, provide its transfer and bind the ink to the sheet. Dyes are soluble in the vehicle. However, dyes are not generally used in printing inks due to their low resistance to light and chemicals and the tendency of the color to migrate into the fibers. Thus, printing inks normally employ pigments which are not soluble in the vehicle, but are mechanically dispersed. The tiny particles of pigment are generally not uniform in particle size and the size can vary from ink-to-ink and color-to-color.

Newsprint, as used in the invention, can include both letterpress and offset newsprint. Inks commonly used in letterpress newsprint contain from about 7% to 17% by weight of carbon black pigment dispersed in a petroleum or mineral oil vehicle. On the other hand, offset newsprint contains a higher proportion of carbon black, in the range of 14% to 20%, dispersed in a similar vehicle and can also contain as much as 40% to 50% of a hydrocarbon resin binder.

The newsprint is deinked by initially pulping the newsprint with water and dispersant chemicals that act to dissociate the ink from the fibers and disperse the ink particles in the aqueous pulp. The chemicals employed in deinking normally include a surfactant or detergent which emulsifies the ink vehicle to release the pigment particles. A degree of alkalinity is beneficial for maxium effectiveness with most surfactants, and the alkalinity can be achieved by the addition of small amounts of sodium hydroxide to maintain the pH of the pulp at a value less than 10.3 and generally in the range of 9.0 to 9.6. A reduction in brightness and permanent color reversion can occur if the pH exceed 10.3.

Depending on the nature of the ink, sodium silicate can be incorporated with the surfactant. Sodium silicate provides alkalinity and its abrasive nature aids in releasing and dispersing ink particles and prevents redeposition of the ink on the fibers.

In addition, hydrogen peroxide and chealating agents can be employed in the deinking process. These chemicals aid in solubilizing certain oils in the ink, act as a brightening agent and permit highly alkaline operation without color reversion.

The pulping is carried out at an elevated temperature generally in the range of about 120° F. to 160° F. Higher temperatures in the above range promote greater chemical efficiency in the deinking. A period of 10 to 50 minutes is generally adequate for the deinking operation.

Following deinking, the deinked newsprint pulp stock is screened to remove larger sized foreign material and then subjected to an ink removal operation. Ink removal can be achieved either by froth flotation or dilution washing, which can include a side hill screen washer, a gravity decker, vacuum filter, an incline screw extractor, or other types of washers. The publication "Beloit Corporation Deinking Manual", 2nd Ed., 1979, describes conventional ink removal processes.

In the froth flotation technique, the pulp at a consistency below 1% solids, is passed through a series of froth flotation cells and air is blown through the stock and dispersed by high speed impellers. Flotation agents, such as kerosene or fatty acids, are added during the process to give the bubbles greater chemical affinity for the ink particles than for the fiber. The ink particles attach to the bubbles and are floated into a froth that is continuously skimmed off.

Dilution washing is a chemical process of rinsing the ink particles from the pulp. The preferred method of ink removal is by discharging the diluted pulp stock at a concentration of about 0.8% to 3.0% solids into the converging nip between a couch roll and a polymeric screen or wire. Liquid from the pulp stock, along with fines and fibers having a length less than about 50 microns, will pass through the screen, while the pulp is retained as a layer on the roll. This type of process can employ a synthetic continuous screen manufactured by Lindsay, having a 1×3 satin weave and a 75×58 mesh size. The liquid passing through the screen is clarified to remove fines and short fibers, and is then recycled for dilution of the newsprint pulp. The pulp, which is retained on the roll, is doctored from the roll and conducted to a chest or tank where it is diluted to a concentration of about 4% solids and is then delivered to the papermaking machine, or the pulp can be washed by the above process several additional times, as will be hereinafter described.

The linerboard is produced from the Kraft and deinked newsprint pulps in the forming section of a standard papermaking machine. In this regard, the Kraft pulp, at a consistency of 0.3% to 1.2% solids, and at a pH of about 6.6 to 8.0 is applied through a headbox to the forming wire to provide a Kraft pulp web or ply. The newsprint pulp at a consistency of 0.3% to 1.5% solids and at a similar pH, is then applied through a second headbox located downstream of the first headbox to the Kraft ply to provide the composite linerboard structure which is then passed through the press section and the dryer section of the papermaking machine in a conventional manner.

As previously noted, a dry strength additive, such as cooked or hydrolyzed starch, is incorporated in the outer newsprint ply and preferably in both plies of the linerboard. It is important that the starch be cooked in situ, meaning it is cooked as it is applied into the pulp stock, rather than being precooked. The in situ cooking can be achieved by a steam injector which heats and hydrolyzes the starch and discharges the hydrolyzed starch into the processing stream. A steam injector, such as that supplied by National Starch Company under the designation "Jet Cooker" can be utilized for this purpose.

The starch is preferably a amphoteric waxy maize type, such as that sold under the designation CAT0225 by National Starch Company. This is a 99% amlyopectin starch. The starch is applied at a rate of approximately 30 lbs. per ton of dry pulp.

The hydrolyzed starch can be introduced into the dilution water for either the Kraft pulp stock or the newsprint pulp stock, or both. The cooked starch is soluble in water, and as the water extracted from both the Kraft pulp and newsprint pulp is recycled, the starch will eventually permeate both the Kraft pulp stock and the newsprint pulp stock, regardless of whether it is fed into the Kraft pulp stock line or the newsprint pulp stock lines, so that in the final product the starch will be incorporated in both the base Kraft ply and the outer newsprint ply.

The starch serves an important function in the invention. As previously related, the newsprint by its very nature, is composed of relatively short fibers and thus has a low tear strength. These characteristics would normally make newsprint unacceptable for use in a product, such as linerboard, which has high strength requirements. However, the starch provides a substantial increase in the internal strength of the newprint ply and also improves the bond between the plies, thus enabling the newsprint to be an acceptable component in the liner board.

In addition to the starch, a neutral or alkaline internal sizing material, such as an alkyl ketone dimer sold under the name Hercon UBK II, can be added to the newsprint pulp in an amount of about 3 to 20 pounds per ton of pulp. The material is effective at the higher pH of the pulp, i.e. 6.0 to 8.0, to make the top newsprint ply of the dry linerboard more hydrophobic so that it will have less tendency to absorb water during service.

A size coating can be applied to the outer surface of the newsprint ply when the ply is almost dry through a suitable size press. The size preferably is ethylated corn starch, such as sold by Penford Product Company under the designation "Penford 220". The dry end starch has a viscosity of 1,000 to 1,500 cps at 9% solids and is applied generally at a rate of 2.0 to 2.5 lbs. per ton of linerboard.

The use of the size coating prevents dusting, adds smoothness to the linerboard and provides an improved printable surface.

Through the invention old or reclaimed newsprint which normally could not be employed as a component of a high strength paper product, can be incorporated as a component in linerboard. By enabling old newsprint to be employed, the invention has a substantial beneficial effect on the ecology.

As a further advantage, the use of the deinked newsprint in the outer ply provides a brighter more aesthetic appearance for a corrugated container incorporating the linerboard. The outer newsprint ply has a brightness of 30 to 60 as measured on the photovolt scale. This compares with a brightness in the range of 16 to 18 for normal unbleached Kraft linerboard. The lighter color provides better graphics and improved color resolution. This is of major importance in reading information printed on corrugated containers, such as bar codes.

Various modes of carrying out the invention are contemplated as being within the scope of the following claims particularly pointing out and distinctly claiming the subject matter which is regarded as the invention.

I claim:

1. A linerboard comprising a first ply of cellulosic fibers, a second ply bonded to said first ply and composed substantially solely of deinked oil newsprint, said newsprint is substantially free of fines and fibers having a length less than 50 microns and a dry strength additive impregnated in said second ply, said additive characterized by the ability to increase the internal strength of said second ply and improve the bond between said plies.

2. The structure of claim 1, wherein the dry strength additive comprises cooked corn starch.

3. The structure of claim 2, wherein the cooked cornstarch comprises 15 to 35 pounds per ton of the old newsprint on a dry weight basis.

4. The structure of claim 1, wherein said cellulosic fibers constitute Kraft pulp.

5. A linerboard, comprising a base ply of Kraft pulp, an outer ply bonded to said base ply and having a fibrous constituent composed solely of de-inked reclaimed newsprint, said outer ply being substantially free of fines and fibers having a length less than 50 microns, and hydrolyzed corn starch impregnated in said outer ply and disposed at the interface between said plies, said corn starch acting to increase the internal strength of said outer ply and improving the bond between said plies.

6. The linerboard of claim 5, wherein said corn starch comprises from 15 to 35 pounds per ton of said reclaimed newsprint on a dry weight basis.

7. The linerboard of claim 5, and including a size coating on the outer exposed surface of said outer ply.

8. The linerboard of claim 7, wherein said size coating comprises corn starch.

9. The linerboard of claim 5, and an internal sizing agent incorporated in said outer ply and characterized by the ability to render said outer ply hydrophobic.

10. The linerboard of claim 9, wherein said agent is an aklyl ketene dimer and is present in an amount of 3 to 30 pounds per ton of said reclaimed newsprint.

11. A linerboard, comprising a base ply of cellulosic fibers, an outer ply bonded to the first ply and composed of deinked old newsprint, and hydrolyzed corn starch impregnated in said outer ply, said linerboard being produced by pulping reclaimed newsprint containing ink to provide a newsprint pulp, removing the ink from said newsprint pulp, removing fines and fibers having a length less than 50 microns from said newsprint pulp, applying the newsprint pulp as said outer layer to said base ply of cellulosic fibers, and impregnating the hydrolyzed corn starch into said outer ply.

* * * * *

UNITED STATES PATENT AND TRADEMARK OFFICE
CERTIFICATE OF CORRECTION

PATENT NO. :  5,011,741

DATED :  April 30, 1991

INVENTOR(S) :  Roger P. Hoffman

It is certified that error appears in the above-identified patent and that said Letters Patent is hereby corrected as shown below:

Col. 6, Line 52, CLAIM 1, Delete "oil" and substitute therefor --old--; Col. 6, Line 54, CLAIM 1, After "microns" insert --,-- (a comma)

Signed and Sealed this

Sixth Day of October, 1992

Attest:

DOUGLAS B. COMER

*Attesting Officer*    Acting Commissioner of Patents and Trademarks